United States Patent Office 3,520,899
Patented July 21, 1970

3,520,899
PROCESS FOR THE PREPARATION OF NITROIMIDAZOLES
Janos Kollonitsch, Westfield, N.J., assignor to Merck & Co., Inc., Rahway, N.J., a corporation of New Jersey
No Drawing. Filed Dec. 30, 1966, Ser. No. 605,977
Int. Cl. C07d 49/36
U.S. Cl. 260—309          5 Claims

ABSTRACT OF THE DISCLOSURE 1-alkyl-5-nitroimidazol-2-ylalkyl carbamates are prepared by reacting the corresponding 1-alkyl-5-nitroimidazol-2-ylalkyl thionocarbamate with a desulfurizing agent. The 1-alkyl-5-nitroimidazol-2-ylalkyl (alkylidene)-carbamates are useful in the treatment of the protozoal parasitic diseases trichomoniasis and enterohepatitis.

BACKGROUND OF THE INVENTION

Field of the invention

The invention pertains to a process for the preparation of certain nitroimidozolyl compounds which are useful against protozoal parasitic diseases.

Description of the prior art

Heretofore, the 5-nitroimidazole alkyl carbamates of the present invention have been prepared from the corresponding 1-alkyl-2-hydroxyalkyl-5-nitroimidazoles by reaction with certain hydroxy reactive reagents. It has been found, however, that the corresponding thionocarbamates may be more readily prepared by similar methods. The present invention provides a simple method of converting the thus produced thionocarbamates into the desired carbamates using simple procedures and readily available and inexpensive reagents.

SUMMARY OF THE INVENTION

A (1-alkyl-5-nitroimidazol-2-ylalkyl) thionocarbamate is treated with a desulfurizing agent under oxidizing conditions to produce the corresponding (1-alkyl-5-nitroimidazol-2-yl)alkyl carbamate.

The compounds produced in accordance with this invention show activity against the causative organisms of the protozoal parasitic diseases, trichomoniasis and enterohepatitis; the latter being a disease occurring primarily in turkeys which is caused by the protozoan parasite *Histomonas meleagridis*.

DESCRIPTIONS OF THE PREFERRED EMBODIMENTS

In the process of the present invention, a compound of the formula:

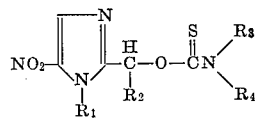

wherein $R_1$ is loweralkyl suitably methyl, ethyl or propyl, $R_2$ is hydrogen or loweralkyl such as methyl or ethyl, and $R_3$ and $R_4$ are hydrogen or loweralkyl suitably methyl, ethyl or propyl, is reacted with a desulfurizing agent under oxidizing conditions. Any desulfurizing agent which will convert a thiono group into the corresponding keto group may be employed, however, lead acetate and mercuric oxide are the reagents of choice.

In the preferred procedure, the 1-alkyl-5-nitroimidazol-2-ylalkyl thionocarbamate is taken up in a suitable oxygenated organic solvent, such as a dialkyl ketone, for example acetone, a lower alkanol, such as methanol, ethanol or propanol or mixtures thereof. The solution is then treated with a desulfurizing agent either in solid form or, for example in the case of lead acetate, as an aqueous solution. The reaction mixture is then allowed to stand at a temperature of from about 15° C. to about 80° C. for from about 12 hours to about 3 days, the length of time being inverse to the temperature employed. Furthermore, the preferred temperature range is related to the reagent used, for example, where lead acetate is the reagent, the preferred reaction conditions are 40° C. to 70° C., preferably 50° C. to 60° C. for from about 12 to 24 hours, preferably for about 18 hours, whereas where mercuric oxide is used as the reagent, it is preferred to carry out the reaction at ambient temperature for about 2 days.

The desired carbamate may then be isolated, the preferred mode of isolation depending somewhat on the desulfurizing agent used. Where lead acetate is employed, the solvents are removed from the reaction mixture by distillation in vacuo and the residue thoroughly extracted with hot water. Concentration of the aqueous extracts yields the desired carbamate in substantially pure form. If desired, the product may be further purified by dissolving it in acetone and treating the acetone solution with adsorbent charcoal, preferably under reflux conditions. The charcoal is removed by filtration, the acetone solution concentrated and the product precipitated by the addition of water.

Where mercuric oxide is the desulfurizing abent, the mercuric sulfide formed in the course of the reaction may be readily removed by filtration. The mercuric sulfide is thoroughly washed with acetone and the combined acetone solution concentrated to yield the desired carbamate in substantially pure form. If desired, however, this product may be further purified in a manner similar to that specified hereinabove.

The following examples are given for the purpose of illustration and not by way of limitation.

EXAMPLE 1

(1-methyl-5-nitroimidazol-2-yl)methyl carbamate 2.16 g. of (1 - methyl - 5 - nitroimidazol - 2 - yl)methyl thionocarbamate are dissolved in a mixture of acetone and methanol (1:1) and a solution of 3.57 g. of lead acetate in 30 ml. of water is added. The mixture is warmed to 50–60° C. for 18 hours. The solvents are then removed by distillation in vacuo and the residue repeatedly triturated with hot water. The combined aqueous extracts are concentrated in vacuo to a volume of circa. 15 ml. from which the desired carbamate separates in crystalline form. The product is filtered and dried and if desired may be further purified by solution in acetone, heating the acetone solution under reflux over adsorbent charcoal, filtering the acetone solution and after concentrating the solution, adding water to precipitate (1-methyl-5-nitroimidazol-2-yl) methyl carbamate, M.P. 172–173° C.

EXAMPLE 2

1-(1-methyl-5-nitroimidazol-2-yl)ethyl carbamate 4.6 g. of 1-(1-methyl-5-nitroimidazol-2-yl)ethyl thionocarbamate are dissolved in acetone and 6 g. of freshly precipitated yellow mercuric oxide is added to form a slurry which is stirred at ambient temperature for 2 days. The black precipitate formed is removed by filtration and the precipitate thoroughly washed with acetone. The acetone wash and filtrate are combined and the solution concentrated to small volume from which 1-(1-methyl-5-nitroimidazol-2-yl) ethyl carbamate, M.P. 156–158.5° C., precipitates in crystalline form.

In accordance with the above procedure but starting with N'-methyl 1-(1-methyl-5-nitromidazol-2-yl)ethyl thionocarbamate or N',N'-diethyl 1-(1-methyl-5-nitroimidazol-2-yl) ethyl thionocarbamate in place of 1-(1'-methyl-5-nitroimidazol-2-yl)ethyl thionocarbamate, there is obtained N'-methyl 1-(1-methyl-5-nitroimidazol-2-yl)ethyl carbamate and N',N'-diethyl-1-(1-methyl-5-nitroimidazol-2-yl)ethyl carbamate.

EXAMPLE 3

1-methyl-5-nitroimidazol-2-ylmethyl carbamate 21.6 g. of 1-methyl-5-nitroimidazol-2-ylmethyl thionocarbamate is dissolved in acetone and 40 g. of freshly prepared moist yellow mercuric oxide is added thereto, the slurry stirred at ambient at ambient temperature for 20 hours and the black precipitate formed is removed by filtration. The residue is washed thoroughly with acetone and the wash combined with the filtrate and concentrated to small volume in vacuo. On addition of water, 1-methyl-5-nitroimidazol-2-ylmethyl carbamate, M.P. 172–173° C., is obtained as a crystalline precipitate.

The starting materials, that is to say, the 1-alkyl-5-nitroimidazol-2-ylalkyl thionocarbamates, used in the process of the present invention may be prepared by several methods; however, the preferred method comprises reacting the 1-alkyl-2-hydroxyalkyl-5-nitroimidazole with phenoxy thiocarbonyl chloride to give the corresponding 1-alkyl-5-nitroimidazol-2-ylalkyl phenyl thionocarbonate which is then treated with ammonia.

For example, 1-methyl - 5 - nitroimidazol - 2 - ylmethyl thionocarbonate may be prepared in the following manner:

5.17 g. of phenoxythiocarbonyl chloride is added dropwise to a cold solution of 4.71 g. of 1-methyl-2-hydroxymethyl-5-nitroimidazole in 15 ml. of pyridine. During addition the pyridine solution is cooled in an ice bath. After about one-third of the carbonyl chloride is added, 10 ml. of pyridine is added to the reaction mixture. On completion of the addition, the mixture is allowed to warm to room temperature and stirred for three and one-half hours. It is then poured into about an equal volume of an ice-water mixture. A gummy precipitate forms. The water is decanted from this precipitate and the solid triturated with 70 ml. of methanol. 70 ml. of water is added and the solid product removed by filtration. It is recrystallized from benzene-hexane to give 1-methyl-5-nitroimidazol-2-ylmethyl phenyl thionocarbonate, M.P. 92–98° C. On further recrystallization from benzene-herane, the product melts at 103–105.5° C.

47.6 ml. of 1 M ammonia in chloroform is added to a solution of 6.98 g. of 1-methyl-5-nitroimidazol-2-ylmethyl phenyl thionocarbonate in 100 ml. of chloroform. The resulting solution is allowed to stand for about 14 hours at room temperature and the solid product removed by filtration. It is essentially pure 1-methyl-5-nitroimidazol-2-ylmethyl thionocarbamate, M.P. 155–159° C.

In accordance with the above procedure but starting with 1-methyl-2-(1'-hydroxyethyl) - 5 - nitroimidazole in place of 1-methyl - 2 - hydroxymethyl - 5 - nitroimidazole, there is obtained the corresponding 1-(1-methyl-5-nitroimidazol-2-yl)ethyl thionocarbamate.

I claim:
1. A process for the preparation of a compound of the formula

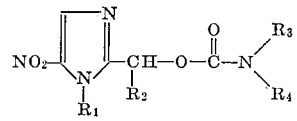

wherein $R_1$ is loweralkyl, $R_2$ is hydrogen or loweralkyl and $R_3$ and $R_4$ are hydrogen or loweralkyl, which comprises reacting a compound of the formula:

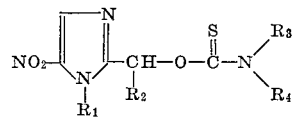

wherein $R_1$, $R_2$, $R_3$ and $R_4$ are as above with a desulfurizing agent of the group lead acetate and mercuric oxide.

2. A process according to claim 1 wherein $R_1$ is methyl, $R_2$, $R_3$ and $R_4$ are hydrogen and the desulfurizing agent is lead acetate.

3. A process according to claim 1 wherein $R_1$ is methyl, $R_2$, $R_3$ and $R_4$ are hydrogen and the desulfurizing agent is mercuric oxide.

4. A process according to claim 1 wherein $R_1$ and $R_2$ are methyl, $R_3$ and $R_4$ are hydrogen and the desulfurizing agent is mercuric oxide.

5. A process according to claim 1 wherein $R_1$ and $R_2$ are methyl, $R_3$ and $R_4$ are hydrogen and the desulfurizing agent is lead acetate.

References Cited

Lecher et al. Jour. Amer. Chem. Soc., vol. 75, pp. 1087–92 (1953).

Reid Organic Chemistry of Bivalent Sulfur, vol. 5, pp. 36–8, New York, Chem. Pub. Co., 1963.

Chem. Abst., vol. 59, Subject Index, J–Z, July–December 1963, p. 1333s (1964).

HENRY R. JILES, Primary Examiner

N. TROUSOF, Assistant Examiner

U.S. Cl. X.R.
260—999